US009869250B2

(12) United States Patent
Hanrahan et al.

(10) Patent No.: US 9,869,250 B2
(45) Date of Patent: Jan. 16, 2018

(54) PARTICLE TOLERANT TURBOSHAFT ENGINE

(71) Applicant: United Technologies Corporation, Hartford, CT (US)

(72) Inventors: Paul R. Hanrahan, Farmington, CT (US); Daniel Bernard Kupratis, Wallingford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 97 days.

(21) Appl. No.: 14/707,208

(22) Filed: May 8, 2015

(65) Prior Publication Data

US 2015/0354453 A1 Dec. 10, 2015

Related U.S. Application Data

(60) Provisional application No. 62/000,886, filed on May 20, 2014.

(51) Int. Cl.
*F02C 7/05* (2006.01)
*F02C 3/04* (2006.01)

(52) U.S. Cl.
CPC .......... *F02C 7/05* (2013.01); *F05D 2260/607* (2013.01); *Y02T 50/675* (2013.01)

(58) Field of Classification Search
CPC .... F02C 7/05; F02C 3/04; F02C 7/052; F02C 7/04; F02C 3/10; F02C 3/13; F02C 3/107; F02C 7/36; F05D 2220/329; F05D 2250/313; F05D 2250/314; F05D 2033/0273; F05D 2033/0286; F05D 35/00; F05D 35/02; F05D 35/04; F05D 35/06; F05D 35/08; B64D 2033/0246; B01D 2279/60; B01D 46/10; F23R 3/04
USPC .............. 60/772, 39.092; 415/121.2; 55/306; 244/53 B; 96/376
See application file for complete search history.

(56) References Cited

U.S. PATENT DOCUMENTS

| | | | | |
|---|---|---|---|---|
| 3,338,049 | A | 8/1967 | Fernberger | |
| 4,878,805 | A | 11/1989 | Hagshenas | |
| 6,134,874 | A | 10/2000 | Stoten | |
| 7,770,375 | B2 | 8/2010 | Alvanos et al. | |
| 7,866,600 | B2 | 1/2011 | Barnard et al. | |
| 8,424,279 | B2 | 4/2013 | Rajamani et al. | |
| 8,439,295 | B2 | 5/2013 | Belyew | |
| 8,578,720 | B2 | 11/2013 | Ebert et al. | |
| 9,038,397 | B2 * | 5/2015 | Papa | F02C 7/14 60/266 |
| 2002/0182062 | A1 | 12/2002 | Scimone | |
| 2012/0063879 | A1 | 3/2012 | Veilleux, Jr. | |
| 2013/0318983 | A1 * | 12/2013 | Zhou | F02C 6/08 60/772 |
| 2014/0026586 | A1 * | 1/2014 | Dusing | F23C 3/002 60/772 |

(Continued)

*Primary Examiner* — Christopher Demeree

(74) *Attorney, Agent, or Firm* — Carlson, Gaskey & Olds, P.C.

(57) ABSTRACT

A gas turbine engine includes a core engine section which includes a compressor section and a core turbine section. The core engine is configured to rotate about a core axis. A drive turbine is configured to rotate about a drive turbine axis. A bypass passage connects an intake to the gas turbine engine directly with an exhaust of the drive turbine.

20 Claims, 2 Drawing Sheets

20
44
60
C
28
42
66
52
ACC. GEARBOX
30
48
MAIN GEARBOX
24
57
50
26
22
56
66
70
60
34
46
40
64
D
38
32
37
54
58
62
36
P

(56) References Cited

U.S. PATENT DOCUMENTS

| | | | | |
|---|---|---|---|---|
| 2014/0033728 | A1* | 2/2014 | Marmilic | F02C 7/141<br>60/772 |
| 2014/0053532 | A1* | 2/2014 | Zysman | B64D 33/00<br>60/226.1 |
| 2014/0271135 | A1* | 9/2014 | Sheridan | F02C 7/36<br>415/122.1 |

* cited by examiner

PARTICLE TOLERANT TURBOSHAFT ENGINE

CROSS-REFERENCE TO RELATED APPLICATIONS

This application claims priority to U.S. Provisional Application No. 62/000,886, which was filed on May 20, 2014 and is incorporated herein by reference.

STATEMENT REGARDING FEDERALLY SPONSORED RESEARCH OR DEVELOPMENT

This invention was made with government support under Contract No. W911W6-13-2-0008, awarded by the United States Army. The Government has certain rights in this invention.

BACKGROUND

Gas turbine engines are incorporated in a wide range of vehicles such as airplanes, rotary-wing aircraft, and land vehicles. During operation of these vehicles, air is continuously being drawn into the gas turbine engine from an outer periphery of the vehicle. The air will then mix with fuel and combust to rotate the engine and turn a transmission or gearbox.

The operating nature of rotary-wing aircraft subjects the gas turbine engine to a wide range of conditions that can cause particles of various sizes to become airborne in the vicinity of the rotary-wing aircraft and be drawn in with air intended to enter the gas turbine engine. This is particularly true when operating a rotary-wing aircraft in a sandy dessert environment as the movement of the rotors can cause the formation of sand clouds. Because sand melts and forms glass at normal operating temperatures for the gas turbine engine, it is important to prevent sand from entering the engine and covering internal components and clogging cooling passages. Therefore, there is a need to prevent particles from entering portions of a gas turbine engine that operate at temperatures above the melting point of sand.

SUMMARY

In one exemplary embodiment, a gas turbine engine includes a core engine section which includes a compressor section and a core turbine section. The core engine is configured to rotate about a core axis. A drive turbine is configured to rotate about a drive turbine axis. A bypass passage connects an intake to the gas turbine engine directly with an exhaust of the drive turbine.

In a further embodiment of the above, the drive turbine axis is separate from and extends in a direction generally transverse to the core axis.

In a further embodiment of any of the above, a splitter is downstream of a first compressor for separating particles from an inlet airflow.

In a further embodiment of any of the above, the first compressor is a mixed flow compressor and a second compressor is a radial flow compressor. The second compressor is downstream of the first compressor.

In a further embodiment of any of the above, a bypass duct is downstream of the splitter.

In a further embodiment of any of the above, the bypass duct includes a duct burner.

In a further embodiment of any of the above, an outlet of the bypass duct is in fluid communication with the drive turbine.

In a further embodiment of any of the above, the bypass duct extends in a generally longitudinal direction.

In a further embodiment of any of the above, the core axis extends in a direction generally transverse to the bypass passage.

In a further embodiment of any of the above, the core axis extends in a direction generally away from a vehicle.

In a further embodiment of any of the above, a heat exchanger is upstream of a combustor section to recover heat from downstream of the core turbine section.

In a further embodiment of any of the above, the core turbine section includes a high pressure turbine connected to the radial flow compressor by a high speed spool.

In a further embodiment of any of the above, the core turbine section includes a low pressure turbine connected to the mixed flow compressor by a low speed spool.

In a further embodiment of any of the above, the core engine section includes a spool that connects the mixed flow compressor and the radial flow compressor with a high pressure turbine and a low pressure turbine.

In a further embodiment of any of the above, a deflector is located at an inlet of the gas turbine engine and is configured to direct airflow towards the bypass passage.

In another exemplary embodiment, a method of operating a gas turbine engine includes directing a first portion of an inlet airflow through a bypass passage to a drive turbine exhaust, directing a second portion of an inlet airflow through a splitter downstream of a first compressor section of a core engine through a bypass duct to a drive turbine, and directing a third portion of the inlet airflow through the core engine into the drive turbine.

In a further embodiment of the above, the drive turbine rotates about a drive turbine axis and the core engine rotates about a core axis. The drive turbine axis is generally transverse to the core axis.

In a further embodiment of any of the above, the method includes igniting a duct burner in the bypass duct to provide additional flow through the drive turbine.

In a further embodiment of any of the above, the method includes transferring heat into a first heat exchanger downstream of a core turbine section to a second heat exchanger upstream of a combustor section.

In a further embodiment of any of the above, the method includes directing cooler air from the bypass duct to the drive turbine to reduce a thermal output of the gas turbine engine.

DETAILED DESCRIPTION

Figure 1:
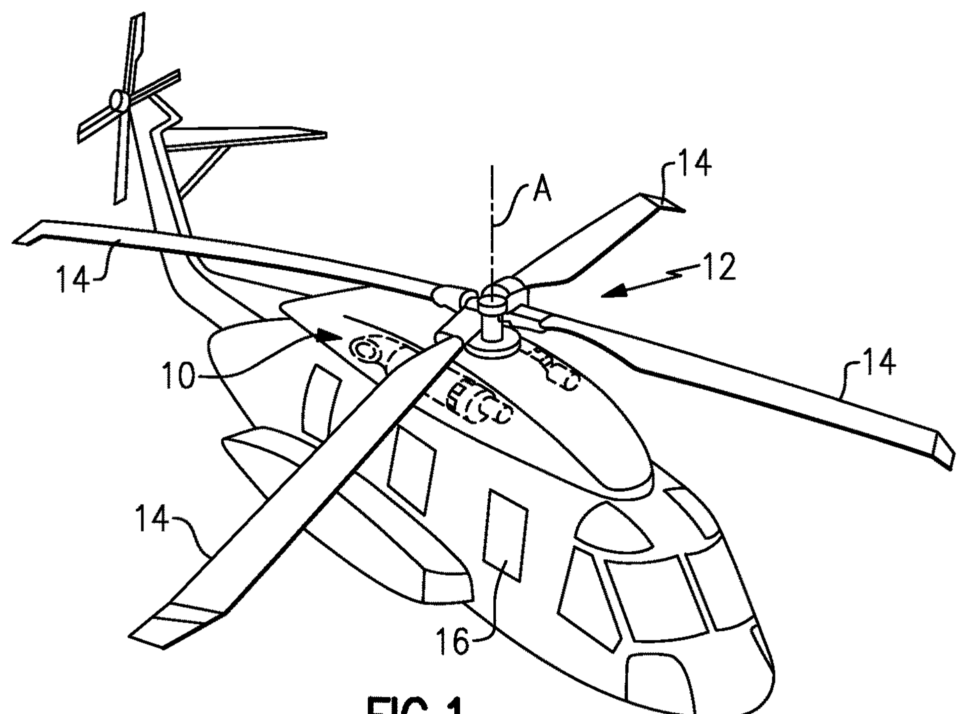
FIG. 1 shows an example vehicle incorporating an example gas turbine engine.

An exemplary non-limiting embodiment of a particle tolerant gas turbine engine 10, such as a turbo shaft engine, on a rotary-wing aircraft 12 is shown in FIG. 1. The rotary-wing aircraft 12 includes rotors 14 that rotate about an A axis and a passenger compartment 16. Although the gas turbine engine 10 is shown in accordance with the rotary-wing aircraft 12, it should be recognized that the gas turbine engine 10 can be used in combination with various vehicles such as an airplane or a land vehicle.

Advantageously, the gas turbine engine 10 allows for the removal of particles P, such as sand, from an inlet airflow entering the gas turbine engine 10 that could potentially damage or hinder the performance of the gas turbine engine 10.

Figure 2:
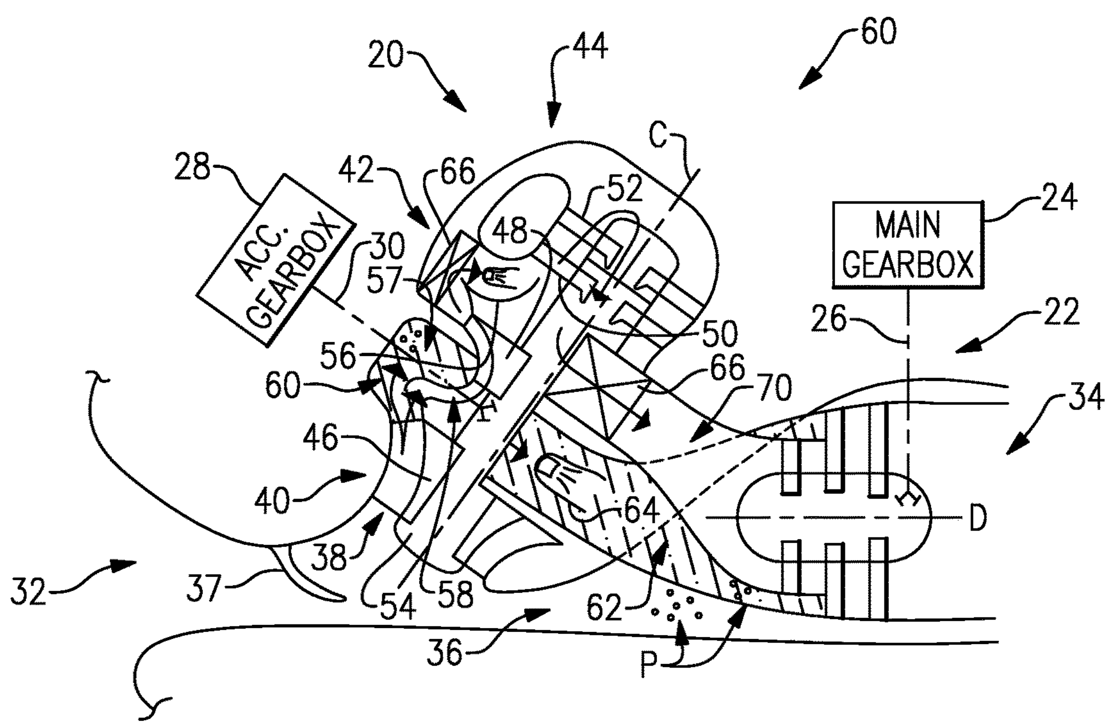
FIG. 2 schematically shows the example gas turbine engine of claim 1.

As shown in FIG. 2, the gas turbine engine 10 includes a core engine 20 that provides input into an accessory gearbox 28 through a shaft 30 and a drive turbine 22 that provides input into a main gearbox 24 through a shaft 26. An inlet 32 provides a passage for airflow into the gas turbine engine 10 and an exhaust 34 expels a gasflow that is products of combustion and a portion of airflow from inlet 32 as well as unwanted particles P from the airflow entering the inlet 32.

The core engine 20 rotates about a C axis and the drive turbine 22 rotates about a D axis. The D axis extends in a direction generally parallel to a plane defined by the rotors 14. The C axis extends in a direction generally transverse to the D axis with a component pointing along the A axis away from the passenger compartment 16 and a component pointing along the D axis.

A bypass passage 36 extends between the inlet 32 and the exhaust 34 bypassing both the core engine 20 and the drive turbine 22. A deflector 37 is located adjacent the inlet 32 for directing the airflow towards the bypass passage 36. The gasflow flowing out of the exhaust 34 creates a suction to draw air mixed with particles P through the bypass passage 36. Because the bypass passage 36 is located below an inlet 38 to the core engine 20, gravity tends to prevent heavier particles P from entering the inlet 38, and because the inlet 38 is oriented transverse to the direction of flow through the inlet 32, inertia tends to prevent heavier particles P from turning and entering the inlet 38, and the suction caused by the gas flow exiting the exhaust 34 draws a portion of the airflow from inlet 32 as well as unwanted particles P through the bypass passage 36.

The core engine 20 includes a compressor section 40, a combustor section 42, and a turbine section 44 connected through a core shaft 54. The compressor section 40 includes a first or low pressure compressor 46 and a second or high pressure compressor 48. In an exemplary non-limiting embodiment, the low pressure compressor 46 is a mixed flow compressor and the high pressure compressor 48 is a radial flow compressor. The turbine section 44 includes a high pressure turbine 50 and a low pressure turbine 52. The combustor 56 is located downstream of the compressor section 40 and upstream of the turbine section 44.

A splitter 57 is located downstream of the low pressure compressor 46 and separates a radially inward portion 58 of the airflow exiting the low pressure compressor 46 from a radially outward portion 60 of the airflow exiting the low pressure compressor 46. The radially outward portion 60 travels into a bypass duct 62 (shaded) that connects to the drive turbine 22 at an intermediate stage where a pressure of the airflow in the bypass duct 62 is greater than a pressure of airflow in the intermediate stage of the drive turbine 22 to prevent the airflow from flowing back up the bypass duct 62.

Because the bypass duct 62 is fed by the radially outward portion 60, many particles P that entered the inlet 38 will generally travel through the radially outward portion 60 instead of the radially inward portion 58. The particles P can then bypass the remaining portions of the core engine 20 and higher stages of the drive turbine 22 to further prevent damage to the gas turbine engine 10.

The bypass duct 62 includes a duct burner 64 to provide additional flow and velocity out through the drive turbine 22 to increase an output to the main gearbox 24. Because the particles P can still be located in the bypass duct 62, the duct burner 64 operates at a temperature below the melting of the particles P. In the case of sand, the duct burner 64 should operate at temperatures below 2100 degrees Fahrenheit to prevent the sand from melting and coating internal portions of the drive turbine 22.

By utilizing the duct burner 64 to increase the gasflow velocity through the drive turbine 22 and separating the core engine 20 from the drive turbine 22, the core engine 20 can be sized to operate at peak efficiency during cruise conditions. This is possible because the duct burner 64 can produce additional power from the drive turbine 22 under high power demand situations such as during takeoffs, landings, or hovering. The duct burner 64 typically does not operate at cruise conditions. Therefore, the overall flight efficiency of the gas turbine engine 10 is improved because the majority of operation time is spent in cruise conditions.

The radially inward portion 58 of airflow passing through the splitter 57 travels into the high pressure compressor 48 and then into a heat exchanger 66 to heat the airflow before the airflow enters the combustor 56. The heat exchanger 66 heats the airflow by receiving heat from downstream of the turbine section 44.

The gasflow exiting the turbine section 44 and the hot side of heat exchanger 66 then enters a core exhaust duct 70 where the gasflow is directed to enter the first stage the drive turbine 22. The gasflow exiting the first stage of the drive turbine 22 enters an intermediate sage of the drive turbine 22 and mixes with the gasflow from the bypass duct 62. The drive turbine 22 extracts energy from the mixed gasflows to rotate the main gearbox 24 to power the rotary-wing aircraft 12. The total gasflow exiting the drive turbine 22 then mixes with the airflow of the bypass passage 36 as it leaves the exhaust 34. The suction caused by the gasflow exiting the exhaust 34 draws a portion of airflow from inlet 32 as well as unwanted particles P through the bypass passage 36.

Figure 3:
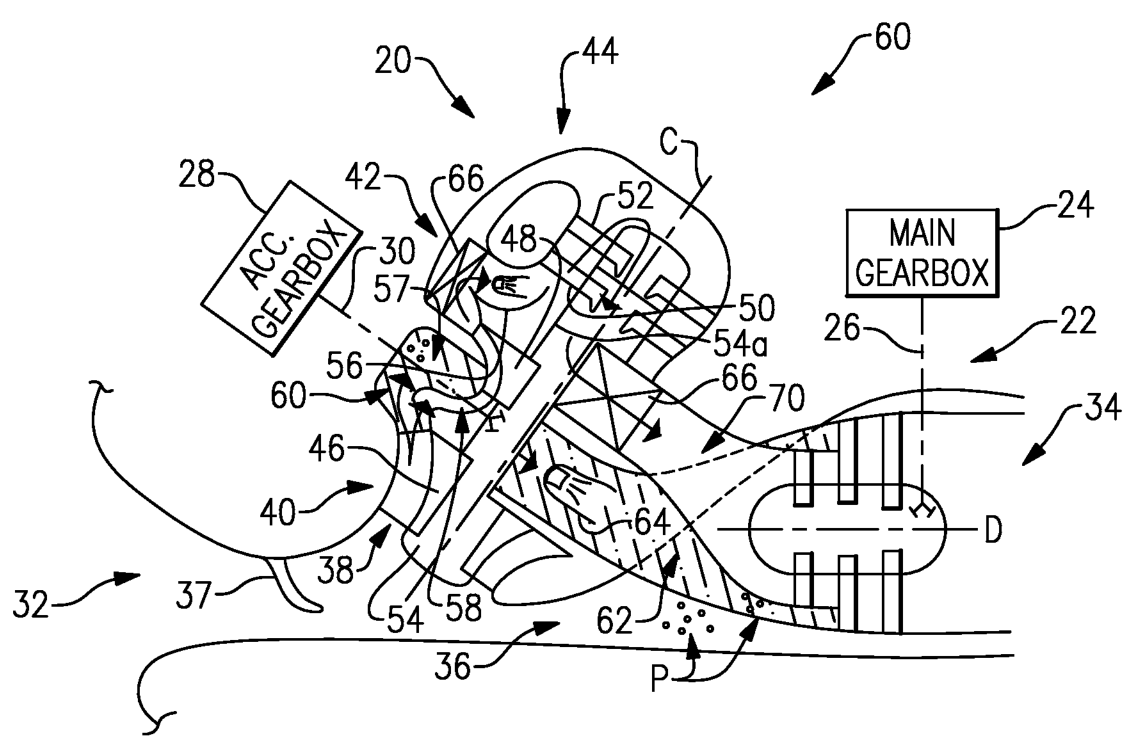
FIG. 3 schematically shows another example gas turbine engine.

The gas turbine engine 100 shown in FIG. 3 is similar to the gas turbine engine 10 shown in FIG. 2 except where described below or shown in the Figures. The gas turbine engine 100 includes a high speed spool **54*a* connecting the high pressure turbine 50 and the high pressure compressor 48 and a low speed spool 54*b* connecting the low pressure turbine 52 and the low pressure compressor 46. The high speed spool 54*a* and the low speed spool 54*b* allow the high pressure turbine 50 and the high pressure compressor 48 to rotate at a different speed from the low pressure turbine 52 and the low pressure compressor 46**.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:

a core engine section including a compressor section and a core turbine section, the core engine is configured to rotate about a core axis;

a drive turbine configured to rotate about a drive turbine axis, wherein the drive turbine axis is separate from and extends in a direction generally transverse to the core axis; and a bypass passage connecting an intake to the gas turbine engine directly with an exhaust of the drive turbine.

2. The gas turbine engine of claim 1, including a splitter downstream of a first compressor for separating particles from an inlet airflow.

3. The gas turbine engine of claim 2, wherein the first compressor is a mixed flow compressor and a second compressor is a radial flow compressor, the second compressor being downstream of the first compressor.

4. The gas turbine engine of claim 3, wherein the core turbine section includes a high pressure turbine connected to the radial flow compressor by a high speed spool.

5. The gas turbine engine of claim 3, wherein the core turbine section includes a low pressure turbine connected to the mixed flow compressor by a low speed spool.

6. The gas turbine engine of claim 3, wherein the core engine section includes a spool connecting the mixed flow compressor and the radial flow compressor with a high pressure turbine and a low pressure turbine.

7. The gas turbine engine of claim 2, including a bypass duct downstream of the splitter.

8. The gas turbine engine of claim 7, wherein the bypass duct includes a duct burner.

9. The gas turbine engine of claim 7, wherein an outlet of the bypass duct is in fluid communication with the drive turbine.

10. The gas turbine engine of claim 9, wherein the bypass duct extends in a generally longitudinal direction.

11. The gas turbine engine of claim 1, wherein the core axis extends in a direction generally transverse to the bypass passage.

12. The gas turbine engine of claim 11, wherein the core axis extends in a direction generally away from a vehicle.

13. The gas turbine engine of claim 1, including a heat exchanger upstream of a combustor section to recover heat from downstream of the core turbine section.

14. The gas turbine engine of claim 1, including a deflector located at an inlet of the gas turbine engine configured to direct airflow towards the bypass passage.

15. The gas turbine engine of claim 1, wherein the core engine is spaced outward of the bypass passage.

16. A method of operating a gas turbine engine comprising:

directing a first portion of an inlet airflow through a bypass passage to a drive turbine exhaust;

directing a second portion of an inlet airflow through a splitter downstream of a first compressor section of a core engine through a bypass duct to a drive turbine, wherein the drive turbine rotates about a drive turbine axis and the core engine rotates about a core axis, the drive turbine axis is generally transverse to the core axis; and directing a third portion of the inlet airflow through the core engine into the drive turbine.

17. The method as recited in claim 16, including igniting a duct burner in the bypass duct to provide additional flow through the drive turbine.

18. The method as recited in claim 16, including transferring heat into a first heat exchanger downstream of a core turbine section to a second heat exchanger upstream of a combustor section.

19. The method as recited in claim 16, including directing cooler air from the bypass duct to the drive turbine to reduce a thermal output of the gas turbine engine.

20. The method of claim 16, wherein the core engine is spaced outward of the bypass passage.

* * * * *